United States Patent [19]

Poffenroth

[11] Patent Number: 5,452,683
[45] Date of Patent: Sep. 26, 1995

[54] ANIMAL DRINKING WATER SUPPLY APPARATUS

[75] Inventor: Kevin Poffenroth, Calgary, Canada

[73] Assignees: Dan J. Schleppe, Beiseker; Keith Colbert, Airdrie, both of Canada

[21] Appl. No.: 227,105

[22] Filed: Apr. 13, 1994

[51] Int. Cl.$^6$ .................................................. A01K 7/00
[52] U.S. Cl. ................................................................ 119/73
[58] Field of Search ............................. 119/73, 74, 78, 119/79

[56] References Cited

U.S. PATENT DOCUMENTS

| | | |
|---|---|---|
| 1,990,640 | 2/1935 | Doherty . |
| 2,236,837 | 4/1941 | Rimmer . |
| 2,775,684 | 12/1956 | Berliner . |
| 3,294,039 | 12/1966 | Ogden . |
| 3,432,642 | 3/1969 | Lohr et al. . |
| 4,704,991 | 11/1987 | Moore . |
| 4,908,501 | 3/1990 | Arnold, III ............................. 119/73 X |
| 5,005,524 | 4/1991 | Berry . |
| 5,138,980 | 8/1992 | Ewing ...................................... 119/73 |
| 5,140,134 | 8/1992 | Revsche et al. . |

*Primary Examiner*—Gene Mancene
*Assistant Examiner*—Thomas Price
*Attorney, Agent, or Firm*—Adrian D. Battison; Murray E. Thrift

[57] ABSTRACT

An animal drinking water supply apparatus includes a cylindrical container in the form of a culvert with a flexible bowl inserted into one end of the culvert so that a horizontal upper edge of the bowl engages over the edge of the culvert with the bowl sitting inside the culvert. A transverse support member is connected across the inside of the culvert to support the base of the bowl. The support member comprises a rectangular tube within which is provided a liquid heat transfer medium and a heating element so that the upper surface of the support member upon which the bowl rests is heated to avoid freezing of the water. The depth of water is maintained within limits by a micro switch detecting the flexing of the bowl in dependence upon the weight of water.

12 Claims, 2 Drawing Sheets

5,452,683

ANIMAL DRINKING WATER SUPPLY APPARATUS

BACKGROUND OF THE INVENTION

This invention relates to a drinking water supply apparatus for animals and particularly an apparatus which includes a heating means for maintaining a heat supply to the water to prevent freezing in cold climatic conditions.

In many areas where the outside temperature drops well below freezing there is severe danger that animal drinking water supplies will freeze so the animal no longer has access to drinking water. This can become very dangerous and many expensive animals can be lost unless the animal handler carefully watches the water supply situation.

Many designs of drinking water supply apparatus have therefore been proposed which include a heat source to prevent the water from freezing. However, these devices have generally been unsatisfactory and farmers are left with a serious concern that the device will fail. This problem therefore remains a significant problem for the average farmer responsible for the well-being of a number of animals kept in conditions in which the apparatus can freeze.

It is one object of the present invention, therefore, to provide a drinking water supply apparatus which includes a heat source to prevent freezing of the drinking water.

According to the invention, therefore, there is provided a drinking water supply apparatus for animals comprising a container having a substantially vertical wall means terminating at a horizontal upper edge defining an open top, a water containing reservoir mounted on the container so as to engage the container at the upper edge and to depend into the container such that the base of the reservoir is received within the container, a transverse support member connected to the vertical wall means so as to define an upper horizontal support surface of the support member within the container for the reservoir, the support member comprising a hollow closed body containing a liquid heat transfer medium, and an electrical heating element mounted on the hollow body of the support member so as to heat the liquid transfer medium within the hollow body to provide heat to the reservoir through the horizontal support surface.

Preferably the reservoir comprises a flexible bowl formed of rubber or the like which has a base sitting upon the transverse support member. Preferably the transverse support member comprises a hollow rectangular tube which is supported at each end on sides of the container. Preferably the amount of water in the reservoir is controlled by detecting the flexing of the flexible bowl in relation to the weight of the water within the bowl thus actuating a solenoid controlled water supply when the bowl moves upwardly in response to a reduction in the weight of the water.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
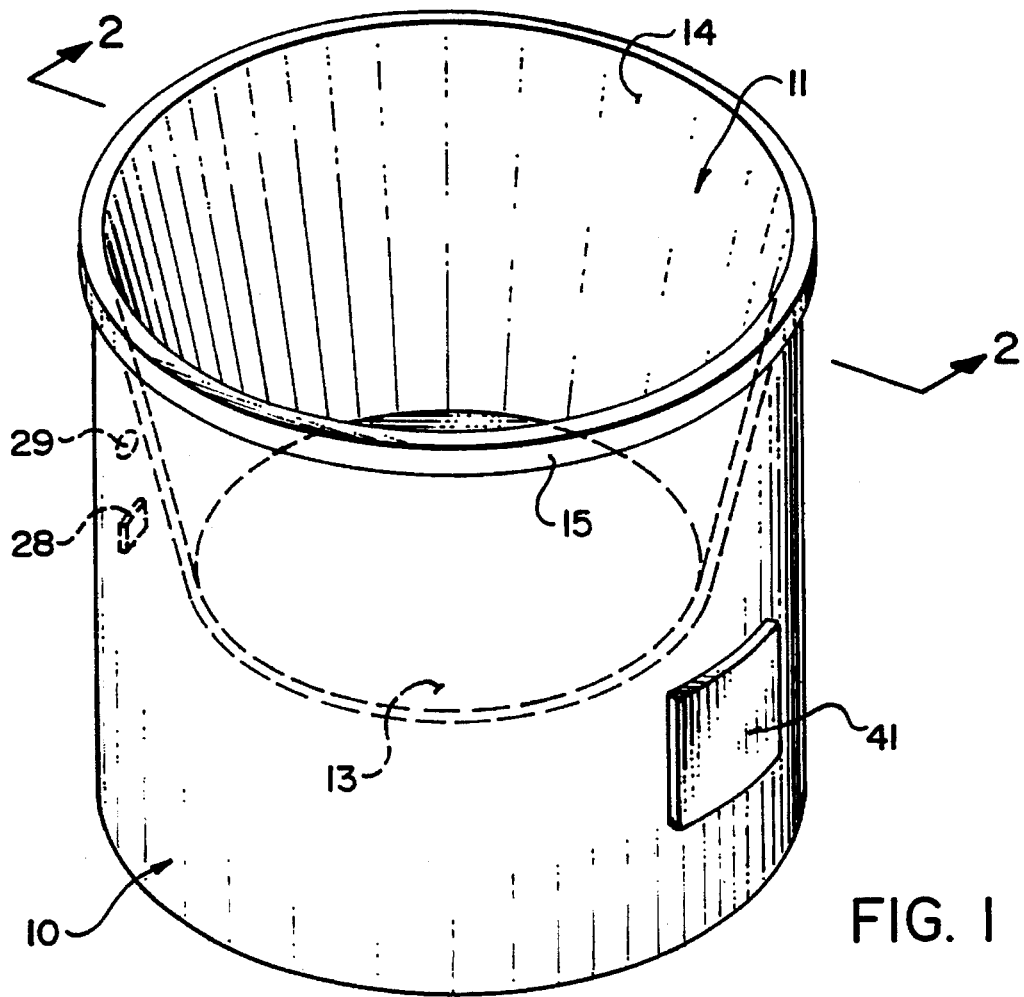
FIG. 1 is an isometric view of animal drinking water supply apparatus according to the present invention.

The apparatus comprises an outer container 10 within which is mounted a reservoir 11 for receiving drinking water 12. The outer container 10 has an outer cylindrical wall which comprises a portion of a cylindrical culvert of the type commercially available for laying as pipe for drainage purposes. The culvert portion is stood on end so as to define a vertical support wall. Generally culvert material of this type has a wall which is corrugated, but for convenience of illustration the corrugations have been omitted. The culvert can be manufactured of any suitable material such as steel or plastics material. A culvert of the order of 24" diameter is preferred but a larger or smaller diameter can be used in some circumstances depending upon the size of the animal and the volume of drinking water to be supplied. Generally the length of the culvert portion is of the the order of 24" to 30". As shown the culvert portion is arranged with one open end resting upon the ground and an opposed end standing upright to define a horizontal upper edge surface which is circular.

The reservoir 11 comprises a flexible bowl formed of rubber or other suitable relatively soft, flexible plastics material. The bowl has a base wall 13 and a peripheral wall 14 which is frusto-conical so as to taper inwardly and downwardly from an upper flange 15 toward the base 13. The flange 15 is arranged at the upper edge of the peripheral wall and is turned downwardly so as to engage over and around the upper edge 16 of the culvert. The flexible bowl is thus partly supported on the upper edge 16 by the flange 15 and is suspended into the culvert so that the base wall 13 is spaced partly down the culvert.

Figure 3:
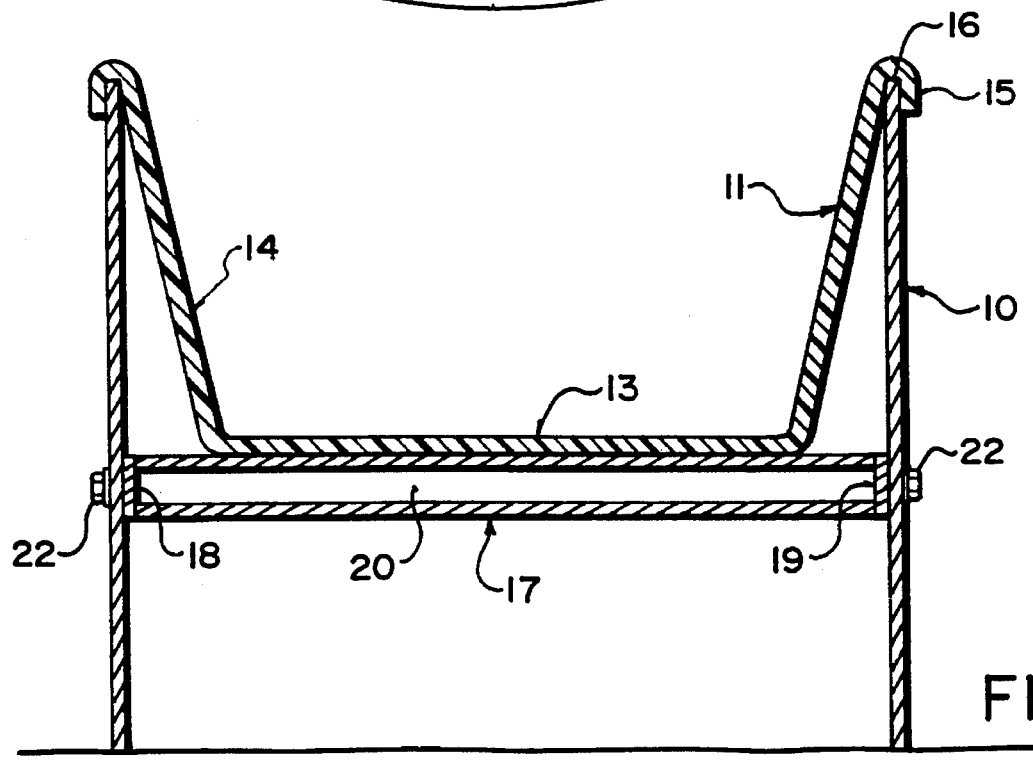
FIG. 3 is a vertical cross-sectional view taken along the lines 3—3 of FIG. 2.
Figure 2:
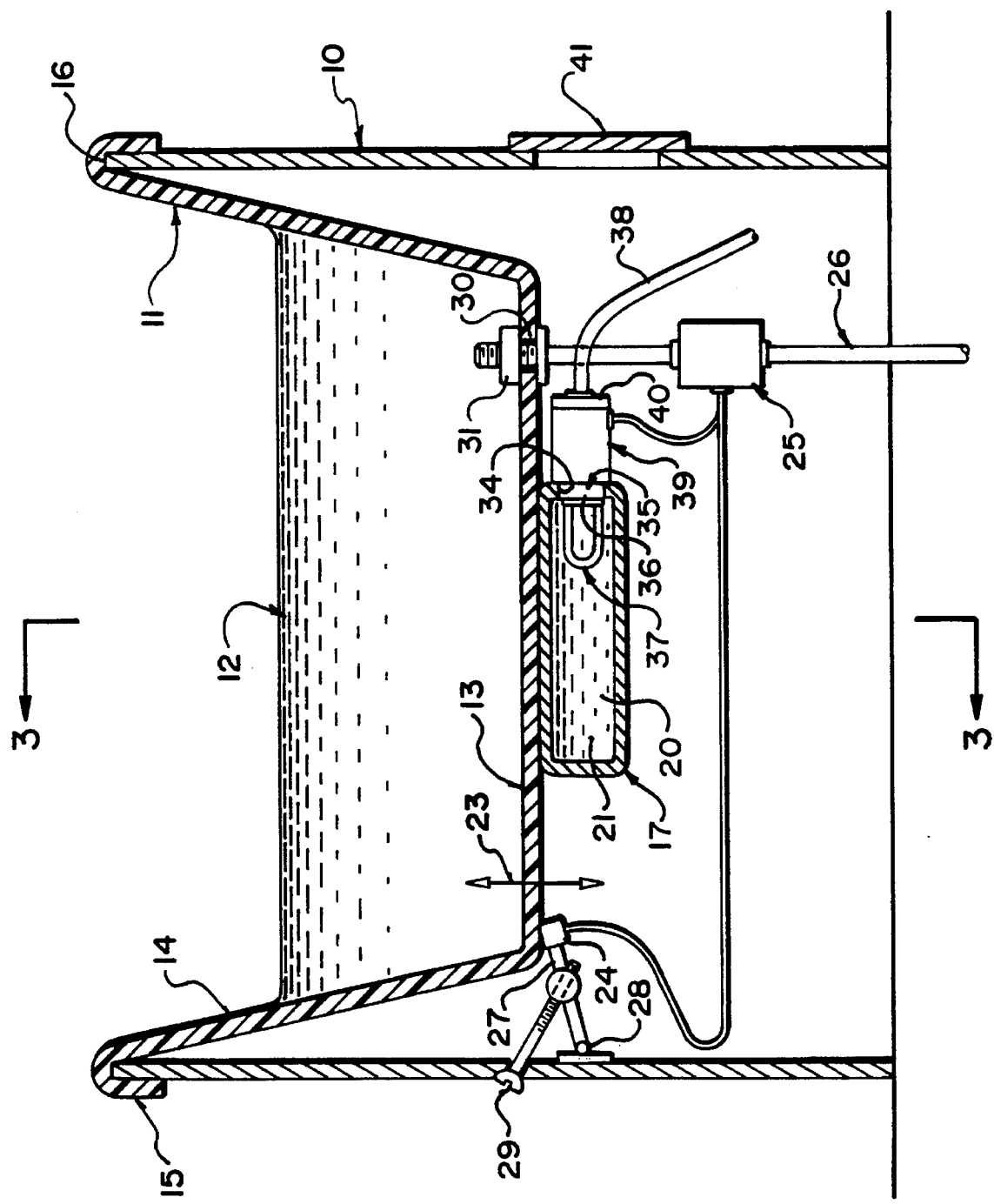
FIG. 2 is a vertical cross-sectional view taken along the lines 2—2 of FIG. 1.

Across the width of the culvert is provided a support bar 17 in the form of a rectangular tube having a length as shown in FIG. 3 so as to extend across the full diameter of the culvert. The width as shown in FIG. 2 is reduced relative to the length so as to extend across a part only of the culvert and support a part only of the base wall 13 of the flexible bowl. The tube 17 can thus be formed of a commercially available 8" by 2" rectangular steel tube with welded end caps 18 and 19. Thus the support member forms a closed hollow body with a hollow interior 20 for receiving a liquid heat transfer medium 21 such as glycol, oil and the like. The ends of the support member are attached to the sidewalls of the culvert, for example by bolts 22. The support member thus provides a partial support for the flexible base of the flexible bowl so that the weight of the water 12 is carried partly on the support member and partly on the upper edge of the culvert.

However, the sides of the bowl on either side of the support member are free to flex in a vertical direction as indicated by the arrow 23. This flexing is effected by the weight of the water within the bowl and is substantially directly proportional to the weight. The flexing is detected by a micro switch 24 positioned to engage the edge of the base of the bowl. The micro switch is thus actuated to a closed circuit condition when the weight of water within the bowl is reduced to a predetermined amount since the bowl then moves upwardly away from the micro switch. The micro switch is connected to a solenoid valve 25 which controls the supply of water through a duct 26 into the bowl. Thus when the micro switch is actuated by the reduction in the amount of water within the bowl, the solenoid valve 25 is opened to allow introduction of further water to the duct 26 into the bowl. This causes the bowl to sag to further engage the micro switch to close off the solenoid valve. The micro switch 24 is carried upon a lever 27 attached to the sidewall of the culvert by a pivot coupling 28. The height of the micro switch can be adjusted by actuating a screw 29 which is connected to the lever 27 partway along its length so as to raise or lower the lever in accordance with the actuation of the screw. It is very simple, therefore, to adjust the actuation of the micro switch to maintain a required depth of water and thus weight of water within the bowl simply by the adjustment of the screw 29. It has been found in practice that this simple control technique will maintain the depth of water within required predetermined limits without excessive cycling of the switch and solenoid valve control circuit.

The duct 26 passes through the base wall 13 of the bowl at a position alongside the support tube 17. For this purpose a hole 30 is cut in the base and the duct extends through that hole. The flexible material of the bowl is clamped between two plates 31 and 32 with one of the plates being moveable by a screw threaded mounting to increase or decrease the amount of clamping action on the rubber material for the base to provide a seal at the opening 30 while allowing the bowl to flex.

In one sidewall of the rectangular tube 17 is provided a circular aperture 34 within which is clamped a heating element 35 of the type used as a block heater for an engine block. Thus the heating element 35 includes a main body 36 having a flange engaging the outside surface of the tube at the aperture and a locking device (not shown) which is actuated to clamp the body into the aperture in sealed relationship. From the inside surface of the body projects a loop-shaped heating element 37 which projects into the fluid 21 to provide a heating action on the fluid. The heating element is actuated by a 110 volt electrical supply 38 which connects to a junction box 39 connected at the heating element. The heating element further includes a thermostat 40 dependent upon the temperature within the container to control the actuation of the heating element. This thermostat and the heating element can be accessed through an access panel 41 provided in the wall of the culvert. The thermostat can be adjusted relatively crudely to control the heat supply from the element 37 into the fluid simply to avoid freezing of the water 12. There is no necessity therefore to maintain accurate control of the temperature since the temperature of the water can vary without harm to the animals from almost freezing to a relatively warm ambient temperature.

The heating element 37 supplies heat into the liquid heat transfer medium 21 and this heat is transferred to the water 12 through the convection action within the liquid and through the conduction of heat from the liquid through the upper surface of the tube 17, through the base of the bowl and into the water.

The use of the liquid heat transfer medium within a relatively large area support member ensures transfer of heat to a relatively wide area. This avoids any freezing of the water at the edges should the temperature of the water drop to almost freezing. At the same time the element is protected within the tube or duct 17 and is not open to the atmosphere or to contamination from the water. It is appreciated that the animals are relatively messy in their drinking habits so that the water and surrounding areas can become contaminated with mucous, food products and the like, but the heating element in this case is carefully protected so that there is no danger of contamination which could interfere with the proper control of the heat supply.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A drinking water supply apparatus for animals comprising a container having a substantially vertical support wall terminating at a horizontal upper edge defining an open top, a water containing reservoir mounted on the container so as to engage the container at the upper edge and to extend downwardly into the container such that the base of the reservoir is received within the container, a transverse support member connected to the vertical wall means so as to define an upper horizontal support surface of the support member within the container for the reservoir, the support member comprising a hollow closed body containing a liquid heat transfer medium, and an electrical heating element mounted in the hollow body of the support member so as to heat the liquid transfer medium within the hollow body to provide heat to the reservoir through the horizontal support surface.

2. The apparatus according to claim 1 wherein the reservoir comprises a flexible bowl.

3. The apparatus according to claim 2 wherein the flexible bowl has a base supported on the horizontal support surface.

4. The apparatus according to claim 2 wherein the flexible bowl has a flange portion thereof at an upper edge thereof engaging over the horizontal upper edge of the container.

5. The apparatus according to claim 2 wherein the flexible bowl has a portion thereof which flexes in a substantially vertical direction in response to changes in the weight of drinking water contained within the bowl and wherein there is provided sensor means responsive to movement of the portion of the bowl to actuate supply of extra water into the bowl.

6. The apparatus according to claim 2 including a water supply duct extending through a base of the flexible bowl, the water supply duct being arranged to clamp material of the flexible base to seal the supply duct at the base.

7. The apparatus according to claim 1 wherein the support member comprises a rigid elongate duct.

8. The apparatus according to claim 7 wherein the duct comprises a rectangular tube, one sidewall of the rectangular tube comprising the support surface.

9. The apparatus according to claim 7 wherein the rigid duct includes an aperture therein with the heating element having a heater body mounted in the aperture such that the heating element member projects from the body into the interior of the duct.

10. The apparatus according to claim 7 wherein the rigid duct is connected to the container at opposed sides thereof so as to extend across the interior of the container at a position therin to support the base of the reservoir.

11. The apparatus according to claim 1 wherein the container comprises a cylindrical wall with a lower end resting upon a ground surface and an upper end defining said horizontal upper edge.

12. The apparatus according to claim 11 wherein the cylindrical wall is formed from a portion of a culvert. wall means and wherein there is provided a screw for varying the angle of the lever to move the sensor vertically to adjust the operation of the sensor in response to the weight of water.

* * * * *